(12) United States Patent
Seppänen

(10) Patent No.: US 7,529,239 B2
(45) Date of Patent: May 5, 2009

(54) DISTRIBUTED DYNAMIC ROUTING

(75) Inventor: Kari Seppänen, Espoo (FI)

(73) Assignee: Intellectual Ventures Holding 9 LLC, Carson City, NV (US)

( * ) Notice: Subject to any disclaimer, the term of this patent is extended or adjusted under 35 U.S.C. 154(b) by 562 days.

(21) Appl. No.: 11/061,492

(22) Filed: Feb. 17, 2005

(65) Prior Publication Data

US 2005/0185645 A1 Aug. 25, 2005

(30) Foreign Application Priority Data

Feb. 24, 2004 (FI) .................................. 20040285

(51) Int. Cl.
*H04L 12/28* (2006.01)
(52) U.S. Cl. ..................................... 370/389
(58) Field of Classification Search ................ 370/389, 370/392, 400, 428
See application file for complete search history.

(56) References Cited

U.S. PATENT DOCUMENTS

| 5,825,772 | A | 10/1998 | Dobbins et al. | |
|---|---|---|---|---|
| 6,331,983 | B1* | 12/2001 | Haggerty et al. | 370/400 |
| 7,197,549 | B1* | 3/2007 | Salama et al. | 709/223 |
| 7,248,579 | B1* | 7/2007 | Friedman | 370/389 |
| 7,277,442 | B1* | 10/2007 | Holmgren et al. | 370/395.53 |
| 2002/0191631 | A1* | 12/2002 | Couty | 370/432 |
| 2003/0048791 | A1* | 3/2003 | De Cnodder et al. | 370/395.42 |
| 2003/0133450 | A1* | 7/2003 | Baum | 370/389 |
| 2004/0202159 | A1* | 10/2004 | Matsubara et al. | 370/389 |
| 2004/0258081 | A1* | 12/2004 | Hayashi | 370/401 |

FOREIGN PATENT DOCUMENTS

| EP | 0845889 A2 | 6/1998 |
|---|---|---|
| WO | WO 02/056551 A1 | 7/2002 |

OTHER PUBLICATIONS

Switched Virtual Networks: Internetworking Moves Beyond Bridges and Routers, Data Comunications, McGraw Hill, New York, New York, United States, vol. 23, No. 12, Sep. 1, 1994.
European Search Report, European Patent Office, Munich, Apr. 18, 2005.

* cited by examiner

*Primary Examiner*—Chirag G Shah
*Assistant Examiner*—Otis L Thompson, Jr.
(74) *Attorney, Agent, or Firm*—McDonnell Boehnen Hulbert & Berghoff LLP

(57) ABSTRACT

In the present invention, packets are routed in a distributed and dynamic manner via an internal packet-switched telecommunication network comprising edge devices. A data packet is received from an external telecommunication network to a source edge device, wherein there is determined the address of the next-hop corresponding to the destination address prefix of the received data packet. The address and network interface of the target edge device corresponding to the determined next hop are determined and there is generated a transmission packet addressed to the determined target edge device, the transmission packet comprising the received data packet and the determined address of the next hop and the determined network interface of the target edge device. The generated transmission packet is transmitted from the source edge device to the target edge device via one or more internal telecommunication networks at the data link layer level. The data packet is sent further via the network interface of the target edge device based on the next-hop address in question.

31 Claims, 3 Drawing Sheets

DISTRIBUTED DYNAMIC ROUTING

RELATED APPLICATION

Figure 1:
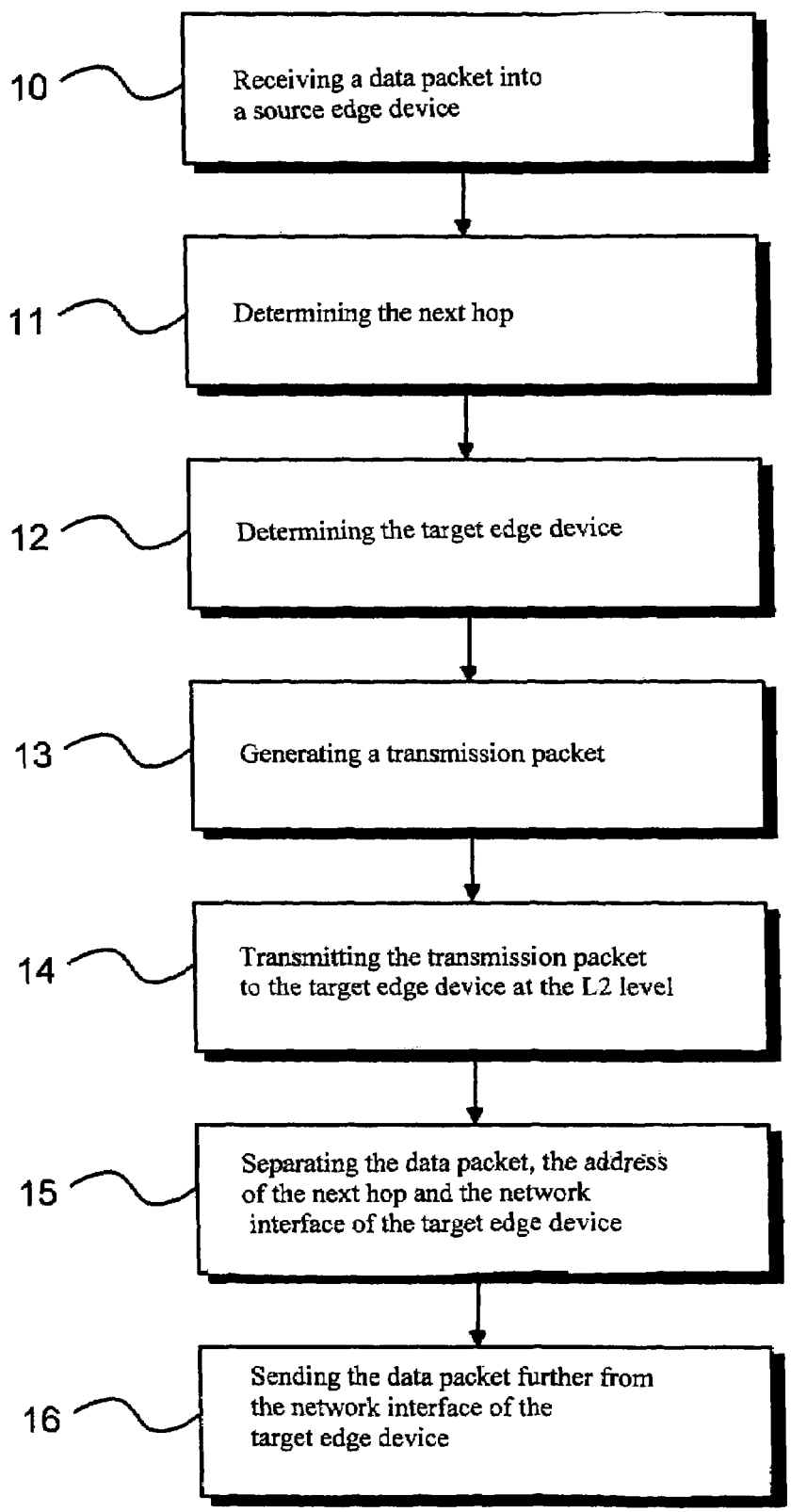

This application claims priority under 35 U.S.C. §119 to Finland Application No. 20040285, filed Feb. 24, 2004.

FIELD OF THE INVENTION

The invention relates to telecommunications. In particular, the invention relates to a novel and advanced method and system for routing packets in a distributed and dynamic manner.

PRIOR ART

Known in prior art are numerous routing arrangements for packet-switched telecommunication networks such as networks implementing the Internet protocol (IP).

A telecommunication network comprises a set of nodes and a medium connecting them. In a packet-switched telecommunication network, the data to be transmitted from the source node to the destination node usually is divided into a set of data packets, which are each transmitted via their own routes to the destination node. Usually the source node and the destination node are disposed in different networks, so the data packets may travel via several different networks.

In the prior art, an individual network typically comprises numerous nodes implementing the routing function i.e. routers. When traveling from the source node to the destination node, a data packet propagates from one router to another. Each router maintains a routing table comprising a set of destination address prefixes and next-hop addresses corresponding to them. The term "next hop" is used to mean a router to which it is advantageous to direct the data packet next on its way towards its destination. As the packet arrives at one router, this router reads the destination address of the destination node of the data packet. Typically, if the read destination address is not disposed in the same network as this router, the router retrieves from its routing table the next-hop address, corresponding to the network part of the destination address, i.e. to the destination address prefix of the data packet, and sends the data packet to this determined next hop.

The router functioning as the next hop does the same thing. In this manner, the data packet propagates from one router to another until it arrives at such a router that is disposed in the same network as the destination node, whereby the router in question typically sends the data packet directly to the destination address. The determined next hop may be disposed in a different network than the router of that moment. Often, however, the determined next hop is disposed in the same network as the router of that moment, whereby the data packet travels via several different routers on its way through an individual network. Each router makes its own routing decision.

Different variations of the prior-art routing described above are known. In the last few years, so-called CIDR addressing has become common (Classless Interdomain Routing, CIDR). Herein, a set of destination address prefixes of a routing table is grouped to form one group based on network topologies. This enables one to reduce the number of entries in the routing table. However, this may result in that some destination addresses correspond to several different destination address prefixes of the routing table. In that case, one must choose from the different destination address prefixes of the routing table the most suitable one, i.e. the longest one. If the alternatives are e.g. 208.12.16/20 and 208.12.21/24, then 208.12.21/24 is chosen because it is longer, i.e. 24 bits long. This operation is called the longest match operation or the longest matching prefix operation.

The problem with the conventional routing is, however, inefficiency, resulting from the fact that the routing decision is made for each packet in each router. In the case of IP networks, the routing decisions are made at the L3 layer level (Level 3, L3), i.e. at the network layer level, resulting in that the detection of faults, locating them and recovering from them must also be performed at the L3 layer level. This is very slow when compared e.g. to such a situation in which these procedures could be made at the L2 layer level (Level 2, L2), i.e. at the data link layer level. Further, from the large number of routing nodes follows that the routers will inevitably be very complicated in order to achieve a bearable performance.

Besides the above-described conventional routing, so-called flow routing is also known. Therein, however, the different flows must be classified and the status data of each flow must be maintained in each router, making the routers very complex. Further, even in flow routing, the detection of faults, locating them and recovering from them must be performed at the L3 layer level, which is slow.

Further, so-called MPLS routing is known (Multiprotocol Label Switching, MPLS). However, its use requires that part of the entire network is MPLS-based. Further, the state of each path must be maintained in each router, making the routers very complex. Further in the case of MPLS routing, the TE routing (Traffic Engineering, TE) and fault tolerance are complicated. In case the network is large and there are a lot of quality classes, the number of paths is greatly increased. Further, the MPLS routing uses pre-configured paths, resulting in limited dynamics.

OBJECTIVE OF THE INVENTION

The objective of the present invention is to disclose a novel method and system that eliminate the aforementioned disadvantages or at least significantly alleviate them. One specific objective of the invention is to disclose a method and system that enable one to route packets in a distributed and dynamic manner in packet-switched telecommunication networks.

SUMMARY OF THE INVENTION

In the present invention, packets are routed in a distributed and dynamic manner via one or more internal telecommunication networks. The internal telecommunication networks comprise each one or more edge devices. Each edge device connects the internal network to one or more external telecommunication networks. The internal and external networks are packet-switched.

The term "internal telecommunication network" refers to a telecommunication network implementing the routing in accordance with the present invention. The term "external telecommunication network" refers to a telecommunication network that does not implement the routing of the invention. The term "edge device" refers to a node of the network that is disposed at the periphery of the network, i.e. is connected, in addition to its own network, also to a node of some other network.

A data packet is received from an external telecommunication network to a source edge device. Next, a next-hop address corresponding to the destination address prefix of the received data packet is determined in the source edge device. The term "source edge device" refers to a such an edge device that receives a data packet from an external telecommunication network. Thus, any edge device of an internal telecommunication network can function as the source edge device.

According to the invention, next, there are determined the address and network interface of a target edge device, corresponding to the next hop which was determined in the source edge device. Thereafter, there is generated in the source edge device a transmission packet addressed to the determined target edge device, the transmission packet comprising the received data packet and the address of the determined next hop, as well as a network interface i.e. a port of the determined target edge device. The term "target edge device" refers to the edge device to which the generated transmission packet is addressed. Thus, any edge device of an internal telecommunication network can function as the target edge device.

Next, the generated transmission packet is transmitted from the source edge device to the determined target edge device via one or more internal telecommunication networks at the data link layer level.

In the target edge device, the data packet and the next-hop address, as well as the network interface of the target edge device are separated from the received transmission packet. Thereafter, the data packet is sent further via the network interface of the target edge device based on the next-hop address.

In one embodiment of the invention, in sending the data packet further from the network interface of the target edge device, there is determined whether the next-hop address is an individual address or a network address. In case it is an individual address, the data packet is sent to the next-hop address. In case it is a network address, the data packet is sent to the destination address included therein.

In one embodiment of the invention, there is maintained in one or more edge devices network routing information comprising destination address prefixes and corresponding next-hop addresses, as well as switching information of the network, comprising next-hop addresses, and addresses and network interfaces of the corresponding target edge devices.

In one embodiment of the invention, in receiving to the edge device new or changed network routing information from an external telecommunications network, the routing and/or switching information maintained by the edge device in question is updated, and there is generated from the received network routing information and the associated network switching information an update packet, which is sent to one or more other edge devices.

In one embodiment of the invention, in receiving to the edge device an update packet, the network routing and/or switching information maintained by the edge device in quest-ion is updated, if necessary, based on the received update packet.

In one embodiment of the invention, the network routing information included in the received update packet is sent to one or more of the external networks to which the edge device in question is connected.

In one embodiment of the invention, a first internal telecommunication network is connected to a second internal telecommunication network by means of a gateway for transmitting transmission packets and update packets between the networks in question. There is maintained in the gateway the routing and switching information for both internal networks separately.

In one embodiment of the invention, in receiving an update packet from a first internal telecommunication network to the gateway, the routing and/or switching information of the first internal telecommunication network that is maintained by the gateway is updated, if necessary; the received update packet is modified by replacing the network interfaces of the target edge devices thereof with the network interface of the gateway in question; the modified update packet is transmitted to one or more edge devices of a second external telecommunication network, and the routing and/or switching information of the network that is maintained by the edge devices which received the modified update packet is updated, if necessary.

In one embodiment of the invention, a transmission packet is transmitted from the source edge device of the second internal telecommunication network, which received the update packet, to the target edge device of the first internal telecommunication network, wherein the network interface of the target edge device of the transmission packet is replaced with the network interface of the gateway. The transmission packet is transmitted to the network interface of the gateway. The switching information maintained by the gateway is used to determine the network interface of the target edge device of the received transmission packet. The network interface of the gateway included in the transmission packet is replaced with the determined network interface of the target edge device. Finally, the transmission packet is sent further from the gateway to the target edge device in question.

In one embodiment of the invention, in receiving a data packet of the multicast type from an external telecommunication network to the source edge device, it is transmitted to the multicast network interface of the target edge devices.

In one embodiment of the invention, service class-specific queues are arranged in one or more edge devices and/or gateways.

In one embodiment of the invention, one or more of the internal and/or external telecommunication networks are IP networks, that is a telecommunication network implementing the Internet protocol (IP).

As compared to the prior art, the present invention has the advantage that it enables the implementation of very efficient distributed routers. The efficiency is based on the fact that just one routing decision is made for a packet entering an internal telecommunication network. In other words, as the packet arrives at the source edge device, a decision is made at the same time as to what target edge device the packet is routed to. Based on the made routing solution, the packet is transmitted directly to the target edge device via an internal telecommunication network at the L2 layer level. Contrary to conventional routing, the packet thus does not travel on its way through the network via several different routers, in each of which, a new routing decision would be made at the L3 layer level.

Further, the routing in accordance with the present invention is very fault tolerant because as the packet is transmitted along the whole way from the source edge device to the target edge device at the L2 layer level, the detection of faults, locating them and recovering from them can be performed at the L2 layer level in the order of milliseconds, which is considerably faster than if these procedures had to be performed at the L3 layer level, like in conventional routing.

LIST OF FIGURES

Figure 2A:
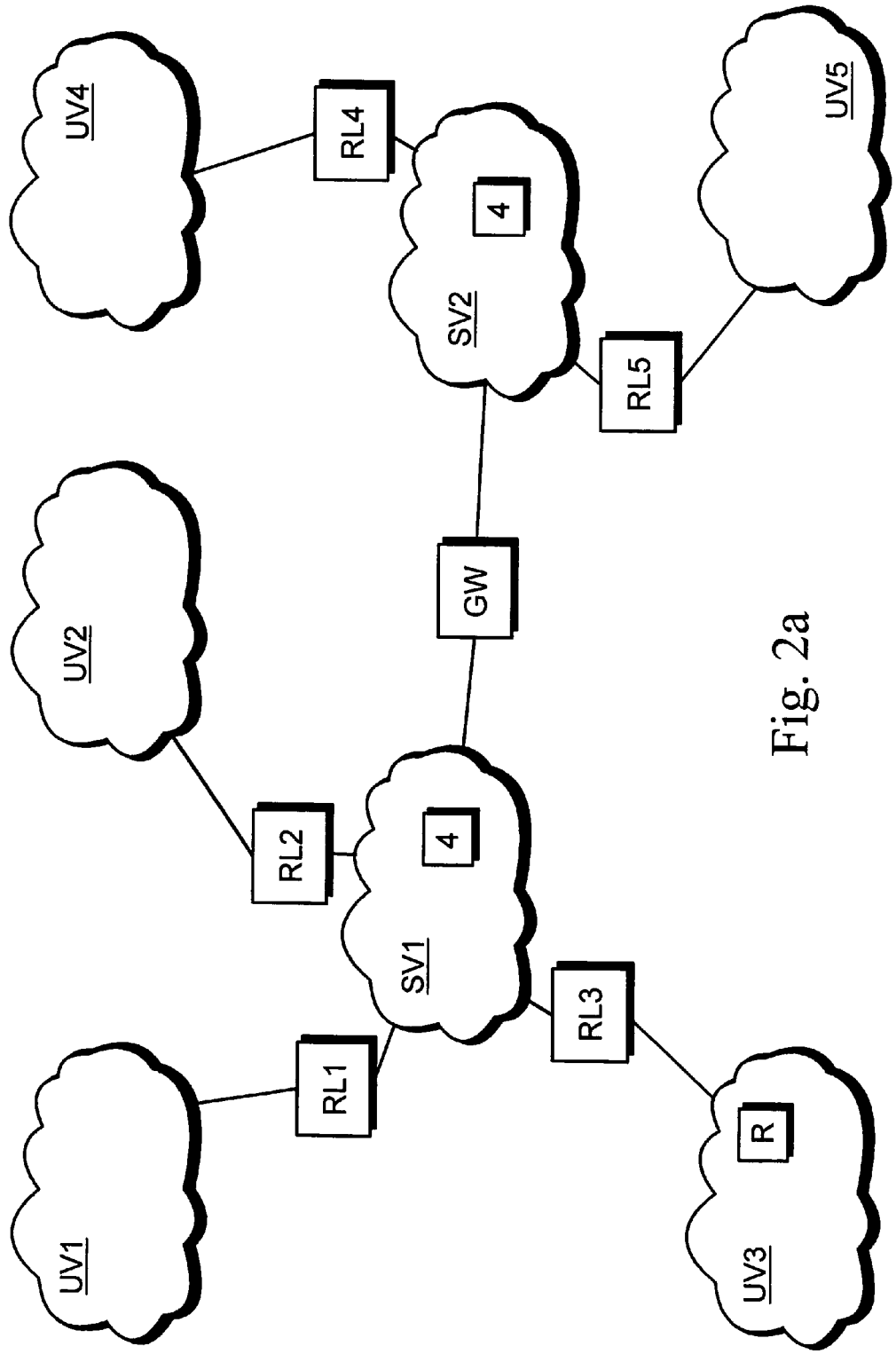
Figure 2B:
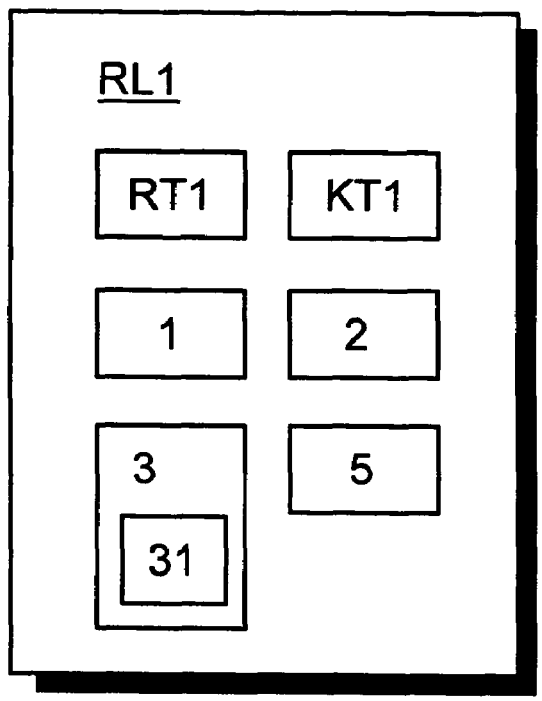
Figure 2C:
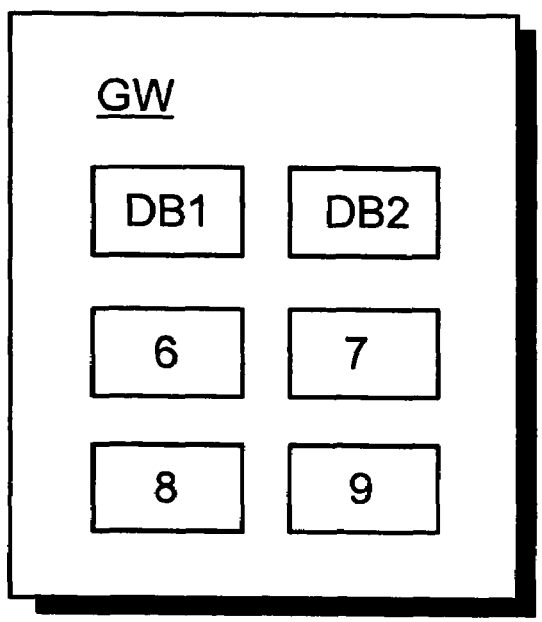

In the following section, the invention will be described by means of the accompanying embodiment examples with reference to the accompanying drawing, in which FIG. 1 schematically represents one method of the invention;

FIG. 2a schematically represents one system of the invention;

FIG. 2b schematically represents one edge device of the invention in more detail; and FIG. 2c schematically represents one gateway of the invention in more detail.

DETAILED DESCRIPTION OF THE INVENTION

FIG. 1 is a flow chart describing, by way of example, one method of the invention, by means of which method packets are routed in a distributed and dynamic manner via one or more internal packet-switched telecommunication networks.

In the method shown in FIG. 1 by way of example, a data packet is received from an external packet-switched telecommunication network to a source edge device, step 10. Next, there is determined in the source edge device the next-hop address, corresponding to the destination address prefix of the received data packet, step 11.

Further, the method as shown in FIG. 1 by way of example determines the address and network interface of the target edge device corresponding to the next hop determined in the source edge device, step 12. Thereafter, at step 13, there is formed in the source edge device a transmission packet addressed to the determined target edge device comprising the received data packet, as well as the determined next-hop address and the network interface of the determined target edge device. Next, at step 14, the formed transmission packet is transmitted from the source edge device to the determined target edge device via one or more internal telecommunication networks at the data link layer level.

In the target edge device, the data packet and the next-hop address, as well as the network interface of the target edge device are separated from the received transmission packet, step 15. Finally, at step 16 it is determined whether the next-hop address is an individual address or a network address. In case it is an individual address, i.e. an address of the next router, the data packet is sent further to the next-hop address via the network interface of the target edge device. In case it is a network address, it means that the final recipient of the data packet is disposed in the same sub-network as the network interface of the target edge device in question, so the data packet is sent further directly to the destination address included therein via the network interface of the target edge device.

FIG. 2a is a flow chart illustrating the components of one exemplary system of the invention at general level. FIG. 2b is a flow chart illustrating, in more detail, the components of edge device RL1 as shown in FIG. 2a by way of example. The rest of the edge devices as shown in FIG. 2a are corresponding. FIG. 2c is a flow chart illustrating, in more detail, the components of the gateway GW as shown in FIG. 2a by way of example. The system as shown in FIGS. 2a, 2b and 2c enables routing of packets in a distributed and dynamic manner.

The system as shown in FIGS. 2a, 2b and 2c by way of example comprises packet-switched internal telecommunication networks SV1, SV2, as well as packet-switched external telecommunication networks UV1, UV2, UV3, UV4 and UV5. Further, the system as shown in FIGS. 2a, 2b and 2c by way of example comprises edge devices RL1, RL2, RL3 and RL5 for receiving data packets from external telecommunication networks. Edge devices RL1, RL2 and RL3 have been arranged in conjunction with internal telecommunication network SV1, and edge devices RL4 and RL5 have been arranged in conjunction with internal telecommunication network SV2.

It must be noted that although in FIG. 2a, each edge device is connected, for the sake of clarity of the figure, just to one external telecommunication network, one or more edge devices can also be connected to several external telecommunication networks. In the system as shown in FIGS. 2a, 2b and 2c by way of example, internal telecommunication networks SV1, SV2 and external telecommunication networks UV1, UV2, UV3 UV4 and UV5 are IP networks. Each edge device can be connected to an external telecommunication network in some manner known per se, such as e.g. via a BGP interface (Border Gateway Protocol), via an OSPF interface (Open Shortest Path First) or via on ISIS interface (Intermediate System to Intermediate System).

Further, in the system as shown in FIGS. 2a, 2b and 2c by way of example, edge devices RL1, RL2, RL3, RL4 and RL5 each comprise a routing table RT1, RT2, RT3, RT4, RT5, respectively, for determining the next-hop address corresponding to the destination address prefix of the received data packet. Further, routing tables RT1, RT2, RT3, RT4, RT5 have been arranged to maintain network's routing information comprising destination address prefixes and next-hop addresses corresponding to them. A routing table can be implemented using some applicable description known per se, or e.g. the longest match operation.

Further, in the system as shown in FIGS. 2a, 2b and 2c by way of example, edge devices RL1, RL2, RL3, RL4 and RL5 each comprise a switching table KT1, KT2, KT3, KT4, Kt5, respectively, for determining the address of the target edge device corresponding to the determined next hop of the received data packet, as well as the network interface of this target edge device via which the next hop can be reached. Further, switching tables KT1, KT2, KT3, KT4, KT5 have been arranged to maintain network's switching information comprising next-hop addresses and addresses and network interfaces of the target edge devices corresponding to them. The network interfaces of the switching tables can be e.g. edge device specific numbers that can be generated e.g. by indexing the ports of the edge device.

For example, a data packet is received to edge device RL1 of internal telecommunication network SV1 from external telecommunication network UV1. In that case, routing table RT1 of edge device RL1 is used to determine that the next hop corresponding to the destination address prefix of the data packet in question is e.g. a router R arranged in external telecommunication network UV3. In that case, switching table KT1 of edge device RL1 is used to determine that the target edge device corresponding to the next hop R in question is edge device RL3 of internal telecommunication network SV1, whose address and network interface are apparent from switching table KT1.

Further, in the system as shown in FIGS. 2a, 2b and 2c by way of example, edge devices RL1, RL2, RL3, RL4 and RL5 each comprise generation means 1 of a transmission packet for generating a transmission packet addressed to the determined target edge device. The transmission packet comprises the received data packet and the address of the determined next-hop and the network interface of the determined target edge device. Further, edge devices RL1, RL2, RL3, RL4 and RL5 each comprise separation means 2 of the transmission packet for separating the data packet and the next-hop address and the network interface of the target edge device from the received transmission packet. It must be noted that e.g. in the case of IP networks, it is possible to use in the transmission packet, as the next-hop address, the IP next-hop address in question or some suitable address index. If, for example, a 10 to 16-bit long index is used instead of 32-bit long IP addresses, a transmission packet to be transferred in an internal telecommunication network can be considerably minimized.

Further, in the system as shown in FIGS. 2a, 2b and 2c by way of example, edge devices RL1, RL2, RL3, RL4 and RL5 each comprise means for sending the data packet further 3 for sending the data packet further via the network interface of the target edge device based on the next-hop address. The means for sending the data packet further 3 comprise address means 31 for determining whether the next-hop address is an individual address or a network address for sending the data packet to the next-hop address, in case it is an individual address, and for sending the data packet to the destination address included therein, in case it is a network address.

Further, the system as shown in FIGS. 2a, 2b and 2c by way of example further comprises transmission means 4 of the transmission packet for transmitting the generated transmission packet from the source edge device to the determined target edge device via one or more internal telecommunication networks at the data link layer level.

Further, in the system as shown in FIGS. 2a, 2b and 2c by way of example, edge devices RL1, RL2, RL3, RL4 and RL5 each comprise update means 5 for updating the routing and switching tables of the edge device in question when receiving new or changed routing information of the network from an external network; for generating an update packet from the received routing information of the network and the associated switching information of the network; and for transmitting the generated update packet to one or more other edge devices.

The routing and switching tables can be implemented e.g. so that the edge device comprises e.g. first and second routing and switching tables. The first routing and switching tables are updated based on the received routing information, but the second routing and switching tables are updated only if the received routing information comprises a new target network or a more advantageous route to a known network. In that case, the first routing and switching tables can thus determine several routes to the same target, but the second routing and switching tables determine just one, e.g. a more advantageous route.

Further, the update means 5 have been arranged to update, if necessary, the routing and switching tables of an edge device comprising the update means in question based on an update packet received from some other edge device, as well as to transmit the received network's routing information included in the update packet further to one or more of the external networks to which the edge device comprising the update means in question is connected. The routing information of the network can be transmitted from edge devices to external telecommunication networks using some applicable standard interface known per se.

Further, the system as shown in FIGS. 2a, 2b and 2c by way of example comprises a gateway GW for connecting internal telecommunication network SV1 to internal telecommunication SV2 for transmitting transmission and update packets between the networks in question. The gateway GW comprises routing database DB1 for maintaining the routing and switching information of internal telecommunication network SV1, and routing database DB2 for maintaining the routing and switching information of internal telecommunication network SV2. The gateway GW further comprises update means 6 of the database for updating routing database DB1 or DB2, according to need, when receiving an update packet into the gateway from internal telecommunication network SV1 or SV2 in the aforementioned order. The gateway GW further comprises modification means 7 for modifying the received update packet by replacing the network interfaces of the target edge devices comprising the switching information with the network interface of the gateway GW.

Further, in the system as shown in FIGS. 2a, 2b and 2c by way of example, the gateway GW comprises transmission means 8 of the modified update packet for transmitting the modified update packet to one or more edge devices of internal telecommunication network SV1 or SV2. Further, update means 5 arranged in the edge devices have been arranged to update, if necessary, the routing and switching tables of the edge device comprising the update means in question based on the modified update packet received by it. Further, the gateway GW comprises replacement means 9 for determining, by means of routing databases, the network interface of the target edge device of the transmission packet received from an edge device of an internal telecommunication network, wherein the network interface of the target edge device of the received transmission packet has been replaced with the network interface of the gateway when sending the transmission packet in question from the source edge device; for replacing the gateway's network interface included in the transmission packet with the determined network interface of the target edge device; and for sending the transmission packet further from the gateway to the target edge device in question.

Further, in the system as shown in FIGS. 2a, 2b and 2c by way of example, edge devices RL1, RL2, RL3, RL4 and RL5 and the gateway GW comprise service class-specific queues. Between the queues it is possible to use some applicable method of allocating turns known per se for appropriately serving the service classes. In case the internal network provides means for transmitting packet-specific information, these means can be used. Otherwise, packet-specific service class information can be e.g. added to the transmission packet being generated.

Further, when in the system as shown in FIGS. 2a, 2b and 2c by way of example, a multicast-type data packet is received to the source edge device from an external telecommunication network, it is transmitted to a predetermined multicast network interface of edge devices. As the edge device recognizes that the data packet incoming from an external telecommunication network is of the multicast-type, it can send it to an internal telecommunication network e.g. either as being of the multicast or broadcast type, depending on the fact of which traffic type is supported by the internal telecommunication network in question. In addition, the packet is sent to a predetermined multicast port, which is not an actual network interface and which is congruent in all the edge devices. This can be implemented e.g. so that the switching table comprises a multicast/broadcast address and a multicast port. As the edge device receives a packet addressed to a multicast port, the packet is transmitted to the interfaces of the external telecommunication network via which the multicast tree travels. For this purpose, the edge devices can be provided e.g. with a specific table describing the multicast addresses as numerals of the network interfaces of the edge devices. Each port, in turn, performs routing of the actual multicast packet to the next hop. The control of the multicast traffic can be implemented e.g. by means of applicable standard interfaces known per se in connection to external telecommunication networks.

The invention is not limited merely to the embodiment examples referred to above; instead many variations are possible within the scope of the inventive idea defined by the claims.

The invention claimed is:

1. A method for routing packets in a distributed and dynamic manner via one or more packet switched internal telecommunication networks, connected by edge devices to one or more packet switched external networks, the method comprising:

receiving a data packet at a source edge device from an external telecommunication network;

determining in the source edge device the next-hop address corresponding to the destination address prefix of the received data packet;

determining in the source edge device the address and network interface of a target edge device, from among a plurality of target edge devices, in response to the determined next-hop address, wherein the next-hop address corresponds to a device in another external telecommunication network;

generating in the source edge device a transmission packet addressed to the target edge device, the transmission packet comprising the received data packet and the determined next-hop address and the determined network interface of the target edge device;

transmitting the generated transmission packet from the source edge device to the determined target edge device via one or more internal telecommunication networks at the data link layer level, wherein the target edge device uses the determined next-hop address to forward the received data packet to the next-hop.

2. The method as defined in claim 1, wherein sending the data packet further from the network interface of the target edge device comprises the steps of:

determining whether said next-hop address is an individual address or a network address;

in case it is an individual address, the data packet is sent to said next-hop address; and in case it is a network address, the data packet is sent to the destination address included therein.

3. The method as defined in claim 1, wherein network routing information is maintained in one or more edge devices, the routing information comprising destination address prefixes and corresponding next-hop addresses; as well as network switching information comprising addresses of the next-hop, and addresses and network interfaces of the corresponding target edge devices.

4. The method as defined in claim 3, wherein when receiving new or changed network routing information at the edge device from an external telecommunication network, the network routing and/or switching information maintained by the edge device is updated; and an update packet is formed from the received network routing information and the associated network switching information, and sent to one or more other edge devices.

5. The method as defined in claim 4, wherein when receiving an update packet to the edge device, the network routing and/or switching information maintained by the edge device is updated, if necessary, based on the received update packet.

6. The method as defined in claim 5, wherein the network routing information included in the received update packet is transmitted further to one or more of the external networks to which the edge device is connected.

7. The method as defined in claim 1, wherein a first internal telecommunication network is connected to a second internal telecommunication network by means of a gateway for transmitting transmission packets and update packets between the internal telecommunication networks, in which gateway there is maintained the routing and switching information for both internal telecommunication networks separately.

8. The method as defined in claim 7, wherein when receiving an update packet to the gateway from a first internal telecommunication network:

updating, if necessary, the routing and/or switching information of the first internal telecommunication network maintained by the gateway;

modifying the received update packet by replacing the network interfaces of the target edge devices that are included in the switching information with the network interface of the gateway in question;

transmitting the modified update packet to one or more edge devices of the second internal telecommunication network; and updating, if necessary, the routing and/or switching information maintained by the edge devices that received the modified update packet.

9. The method as defined in claim 8, wherein sending a transmission packet from a source edge device of the second internal telecommunication network that received the modified update packet to a target edge device of the first internal telecommunication network, wherein the network interface of the target edge device of the transmission packet is replaced with the network interface of the gateway;

transmitting the transmission packet to said network interface of the gateway;

determining, by means of the switching information maintained by the gateway, the network interface of the target edge device of the received transmission packet;

replacing the gateway's network interface included in the transmission packet with the determined network interface of the target edge device; and sending the transmission packet further from the gateway to the target edge device.

10. The method as defined in claim 1, wherein when receiving a data packet of the multicast type from an external telecommunication network to a source edge device, it is transmitted to the multicast network interface of target edge devices.

11. The method as defined in claim 1, wherein one or more edge devices are provided with service class-specific queues.

12. The method as defined in claim 1, wherein one or more of the internal and/or external telecommunication networks are IP networks.

13. A system for routing packets in a distributed and dynamic manner, the system comprising:

one or more packet switched internal telecommunication networks connected by edge devices for receiving a data packet from one or more packet switched external networks, one or more of the edge devices comprising:

a routing table for determining the next-hop address corresponding to a destination address prefix of the received data packet;

a switching table for determining the address and network interface of a target edge device, from among a plurality of target edge devices, in response to the determined next-hop address of the received data packet, wherein the next-hop address corresponds to a device in another external telecommunication network;

generation means for generating a transmission packet addressed to the determined target edge device, the transmission packet comprising the received data packet and the determined next-hop address and the determined network interface of the target edge device;

separation means of the transmission packet for separating the data packet and the next-hop address and the network interface of the target edge device from the received transmission packet;

sending means for sending the data packet further via said network interface of the target edge device based on the next-hop address, and in that the system further comprises:

transmission means for transmitting the generated transmission packet from the source edge device to the determined target edge device via one or more internal telecommunication networks at the data link layer level.

14. The system as defined in claim 13, wherein the means for sending the data packet further comprise: address means for determining whether said next-hop address is an individual address or a network address; for sending the data packet to said next-hop address, in case it is an individual address; and for sending the data packet to the destination address included therein, in case it is a network address.

15. The system as defined in claim 13, wherein one or more of the routing tables maintain the network's routing information comprising destination address prefixes and addresses of the next-hop corresponding to them.

16. The system as defined in claim 15, wherein one or more of the switching tables maintain the network's switching information comprising addresses of the next-hop and addresses and network interfaces of the target edge devices corresponding to them.

17. The system as defined in claim 16, wherein one or more of the edge devices further comprise update means for updating the routing and switching tables of the edge device when receiving new or changed routing information of the network from an external network; for generating an update packet from the received routing information of the network and the associated switching information of the network; and for transmitting the generated update packet to one or more other edge devices.

18. The system as defined in claim 17, wherein one or more of the update means update, if necessary, the routing and switching tables of the edge device based on the update packet received by it.

19. The system as defined in claim 18, wherein one or more of the update means transmit the network's routing information included in the update packet received by them further to one or more of the external networks to which the edge device is connected.

20. The system as defined in claim 13, wherein the system further comprises:
one or more gateways (GW) for connecting a first internal telecommunication network to a second internal telecommunication network for transmitting transmission packets and update packets between the networks in question, the gateway comprising:
a first routing database for maintaining the routing and switching information of the first internal telecommunication network, and
a second routing database for maintaining the routing and switching information of the second internal telecommunication network.

21. The system as defined in claim 20, wherein one or more of the gateways (GW) further comprise:
update means of the database for updating the first routing database, according to need, when receiving an update packet into the gateway from the first internal telecommunication network;
modification means for modifying the received update packet by replacing the network interfaces of the target edge devices that are included in the switching information with the network interface of the gateway in question;
transmission means of a modified update packet for transmitting the modified update packet to one or more edge devices of the second internal telecommunication network, and in that
one or more of the update means have been further arranged to update, if necessary, the routing and switching tables of the edge device comprising the update means in question based on the modified update packet received by it.

22. The system as defined in claim 21, wherein one or more of the gateways (GW) further comprise:
replacement means for determining, by means of routing databases, the network interface of the target edge device of the transmission packet received from an edge device of an internal telecommunication network, wherein said network interface of the target edge device of the received transmission packet has been replaced with the network interface of the gateway when sending the transmission packet in question from the source edge device; for replacing the gateway's network interface included in the transmission packet with the determined network interface of the target edge device; and for sending the transmission packet further from the gateway to the target edge device in question.

23. The system as defined in claim 13, wherein one or more of the edge devices comprise service class-specific queues.

24. The system as defined in claim 13, wherein one or more of the internal and/or external networks are IP networks.

25. An apparatus for routing packets in a distributed and dynamic manner and for connecting one or more packet switched internal networks to one or more packet switched external networks, the apparatus comprising:
means for receiving a data packet from a packet switched external network;
a routing table for determining the next-hop address corresponding to the destination address prefix of the received data packet;
a switching table for determining the address and network interface of a target apparatus, among a plurality of target apparatuses, in response to the determined next-hop address of the received data packet, wherein the next-hop address corresponds to a device in another external telecommunication network;
means for generating a transmission packet addressed to the determined target apparatus, the transmission packet comprising the received data packet and the determined next-hop address and the determined network interface of the target apparatus; and,
means for transmitting the transmission packet to the determined target apparatus.

26. The apparatus as defined in claim 25, wherein the routing table maintains the network's routing information comprising destination address prefixes and addresses of the next-hop corresponding to them.

27. The apparatus as defined in claim 26, wherein the switching table maintains the network's switching information comprising addresses of the next-hop and addresses and network interfaces of the target apparatuses corresponding to them.

28. The apparatus as defined in claim 27, wherein the apparatus further comprises update means for updating the routing and switching tables of the apparatus when receiving new or changed routing information of the network from an external network; for generating an update packet from the received routing information of the network and the associated switching information of the network; and for transmitting the generated update packet to one or more other apparatuses.

29. The apparatus as defined in claim 28, wherein the update means updates, if necessary, the routing and switching tables of the apparatus based on the update packet received by it.

30. The apparatus as defined in claim 29, wherein the update means transmit the network's routing information included in the update packet received by them further to one or more of the external networks to which the apparatus is connected.

31. The apparatus as defined in claim 25, wherein it comprises service class-specific queues.

* * * * *